United States Patent
Barsness et al.

(10) Patent No.: US 9,218,395 B2
(45) Date of Patent: Dec. 22, 2015

(54) MANAGING ATTRIBUTES IN STREAM PROCESSING

(71) Applicant: International Business Machines Corporation, Armonk, NY (US)

(72) Inventors: Eric L. Barsness, Pine Island, MN (US); Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 13/847,520

(22) Filed: Mar. 20, 2013

(65) Prior Publication Data

US 2014/0289240 A1    Sep. 25, 2014

(51) Int. Cl.
*G06F 17/30* (2006.01)

(52) U.S. Cl.
CPC .............................. *G06F 17/30516* (2013.01)

(58) Field of Classification Search
USPC ........................................................ 707/608
See application file for complete search history.

(56) References Cited

U.S. PATENT DOCUMENTS

| | | | |
|---|---|---|---|
| 7,496,683 B2 | 2/2009 | Lang et al. | |
| 7,613,848 B2 | 11/2009 | Amini et al. | |
| 7,644,110 B2 | 1/2010 | Nishizawa et al. | |
| 8,095,690 B2 | 1/2012 | Kashiyama et al. | |
| 8,214,521 B2 | 7/2012 | Takagi et al. | |
| 8,250,044 B2 | 8/2012 | Santosuosso | |
| 8,291,006 B2 | 10/2012 | Andrade et al. | |
| 2008/0256253 A1* | 10/2008 | Branson et al. | 709/231 |
| 2008/0288255 A1* | 11/2008 | Carin et al. | 704/256.1 |
| 2009/0313614 A1 | 12/2009 | Andrade et al. | |
| 2011/0302164 A1* | 12/2011 | Krishnamurthy et al. | 707/737 |
| 2012/0066184 A1* | 3/2012 | Barsness et al. | 707/687 |
| 2012/0179809 A1* | 7/2012 | Barsness et al. | 709/224 |
| 2012/0215934 A1 | 8/2012 | Barsness et al. | |
| 2012/0218268 A1 | 8/2012 | Accola et al. | |

(Continued)

OTHER PUBLICATIONS

Ballard et al., "IBM InfoSphere Streams: Harnessing Data in Motion", Sep. 2010. 360 pages, IBM Redbooks. http://www.redbooks.ibm.com/abstracts/sg247865.html.

(Continued)

*Primary Examiner* — Hosain Alam
*Assistant Examiner* — Robert F May
(74) *Attorney, Agent, or Firm* — Jonathan V. Sry; James R. Nock

(57) ABSTRACT

A method and system for managing attributes in a streaming application is disclosed. The system may have a stream manager communicatively coupled with processing elements for tracking a stream of tuples. The system may also have a first stream operator communicatively coupled with the stream manager and capable of receiving the stream of tuples, wherein the first stream operator selects the selected attribute of the first tuple and assigns a first identifier to the selected attribute. The system may also have a second stream operator communicatively coupled with the stream manager and capable of receiving the stream of tuples, and capable of replacing the selected attribute in the second tuple with a second identifier provided by the first stream operator. The system may also have an identifier table communicatively coupled with the stream manager and the first and second stream operator, wherein the identifier table includes identifiers for selected tuples.

19 Claims, 15 Drawing Sheets

(56) References Cited

U.S. PATENT DOCUMENTS

2013/0054779 A1* 2/2013 Cradick et al. ............... 709/224
2014/0095728 A1* 4/2014 Zhu et al. ..................... 709/231

OTHER PUBLICATIONS

Barsness et al., "Managing Attributes in Stream Processing Using a Cache", Filed Mar. 20, 2013. U.S. Appl. No. 13/847,515.

Zhang et al., "Workload Characterization for Operator-Based Distributed Stream Processing Applications," DEBS'10, Jul. 12-15, 2010, Cambridge, UK; ACM 978-1-60558-927-5/10/07.

Santosuosso et al., "Management System for Processing Streaming Data", Filed Jul. 26, 2011. U.S. Appl. No. 13/190,810.

* cited by examiner

MANAGING ATTRIBUTES IN STREAM PROCESSING

FIELD

This disclosure generally relates to stream computing, and in particular, to computing applications that receive streaming data and process the data as it is received.

BACKGROUND

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data. The method, system, and computer program receive streaming data to be processed by a plurality of processing elements comprising one or more stream operators.

One embodiment is directed to a system for referencing attributes from a stream of tuples in a stream-based application. The system may have a plurality of processing elements capable of receiving the stream of tuples. The stream of tuples may have at least a first tuple and a second tuple. The system may also have a stream manager communicatively coupled with the processing elements for tracking the tuples and having a capability of selecting attributes in tuples, wherein one or more selected attributes are chosen from a group of candidate attributes. The system may also have a first stream operator communicatively coupled with the stream manager and capable of receiving the stream of tuples, wherein the first stream operator selects the selected attribute of the first tuple and assigns a first identifier to the selected attribute. The system may also have a second stream operator communicatively coupled with the stream manager and capable of receiving the stream of tuples, and capable of replacing the selected attribute in the second tuple with a second identifier provided by the first stream operator. The system may also have an identifier table communicatively coupled with the stream manager and the first and second stream operator, wherein the identifier table includes identifiers for selected tuples.

Another embodiment is directed to a method for processing a stream of tuples in a stream based application. A stream of tuples may be received to be processed by a plurality of processing elements operating on one or more computer processors. Each tuple may contain one or more attributes. Each processing element may have one or more stream operators. Each processing element may be assigned to one or more compute nodes. The method may also include examining one or more candidate attributes. The method may include selecting a selected attribute from one or more candidate attributes. The method may also include adding an identifier to the tuple. The method may include using the identifier to retrieve the selected attribute. The method may include monitoring one or more stream operators for one or more removal factors. The method may also include dereferencing the selected attribute if the removal factor is present.

Another embodiment is directed to a method for processing a stream of tuples in a stream based application. A stream of tuples may be received to be processed by a plurality of processing elements operating on one or more computer processors. Each processing element may have at least a first stream operator. Each stream operator may be communicatively coupled to a stream manager. The method may include examining one or more candidate attributes, then selecting one or more selected attributes from the candidate attributes. The method may also include identifying the selected attribute of a first tuple. The method may also include substituting the selected attribute of a second tuple with a unique identifier, wherein the unique identifier is matched to the selected attribute in an identifier table. The method may also include reading the unique identifier with a second stream operator, wherein the second stream operator requires the selected attribute. The method may also include transmitting the selected attribute from the first tuple to the second stream operator. The method may also include monitoring one or more stream operators for one or more removal factors. The method may also include modifying the identifier table if the removal factor is present.

BRIEF DESCRIPTION OF THE DRAWINGS

Like reference numbers and designations in the various drawings indicate like elements.

DETAILED DESCRIPTION

Figure 1:
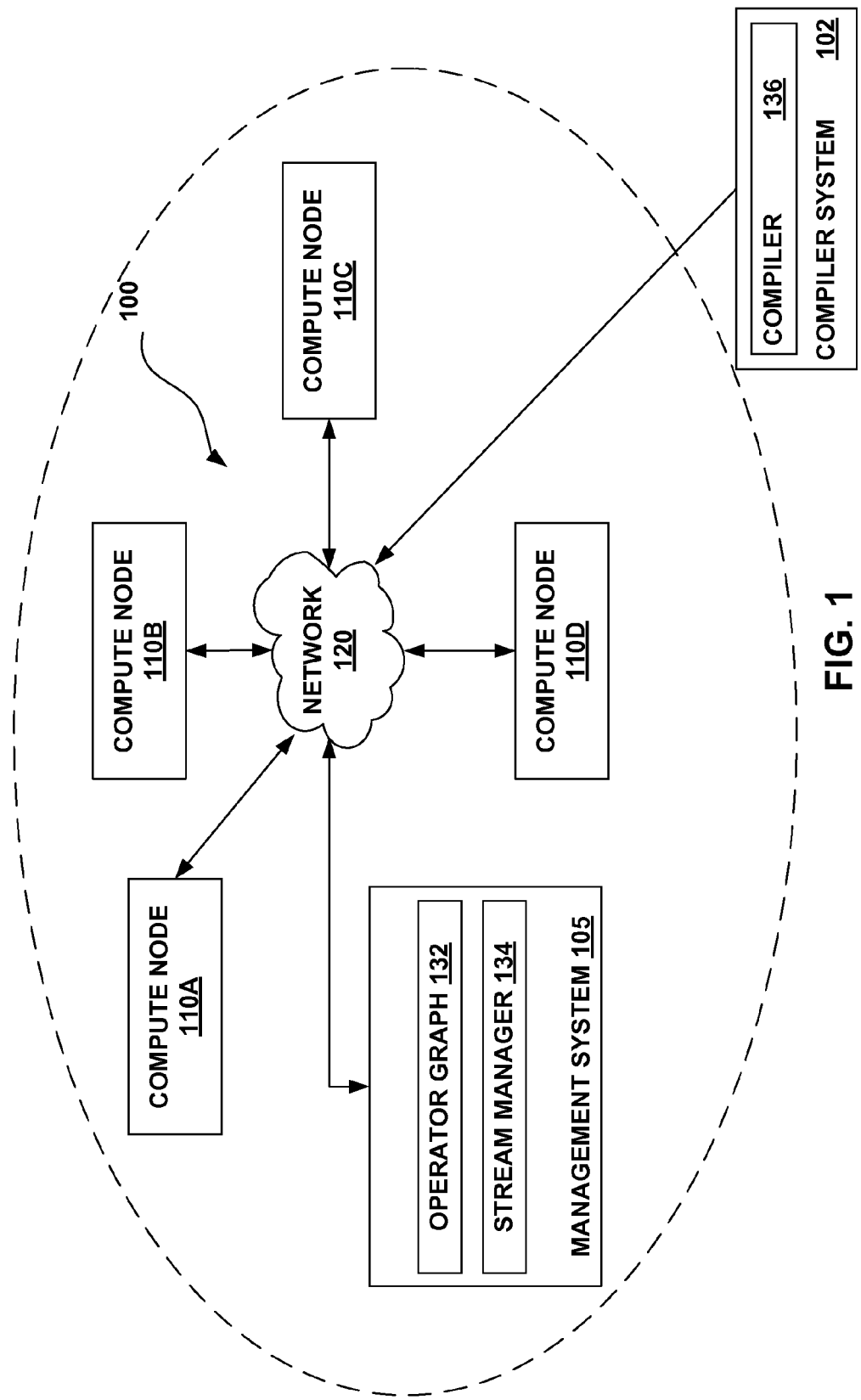
FIG. 1 illustrates a computing infrastructure configured to execute a stream computing application, according to various embodiments.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream-based computing application, stream operators are connected to one another such that data flows from one stream operator to the next (e.g., over a TCP/IP socket). Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application.

A "tuple" is data. More specifically, a tuple is a sequence of one or more attributes associated with an entity. Attributes may be any of a variety of different types, e.g., integer, float, Boolean, string, etc. The attributes may be ordered. A tuple may be extended by adding one or more additional attributes to it. An attribute data value is a particular data value assigned to the attribute. For example, if the tuple contains an attribute for hair color, then an attribute data value may be blonde. In this disclosure, the term attribute and attribute data value may be used interchangeably. In addition to attributes associated with an entity, a tuple may include metadata, i.e., data about the tuple. As used herein, "stream" or "data stream" refers to a sequence of tuples. Generally, a stream may be considered a pseudo-infinite sequence of tuples.

Tuples are received and output by processing elements. A tuple corresponding with a particular entity, i.e., a particular piece of data, received by a processing element, however, is generally not considered to be the same tuple that is output downstream, even if it corresponds with the same entity or data. Typically, the output tuple is changed in some way by the processing element. An attribute or metadata may be added, deleted, or changed. However, it is not required that the output tuple be changed in some way. Generally, a particular tuple output by a processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second.

The movement of massive amounts of data to different stream operators on different compute nodes may correspond to an increased load on a network which may slow performance of a streaming application. Because all of the attributes may not be processed by every compute node, performance improvements may be obtained by avoiding processing of attributes that are not frequently processed or have a high network load cost. In order to avoid processing, data values contained in the attribute may be referenced, e.g., stored in a cache for future reference and using a unique identifier in place of the attribute data value. The disclosure concerns the method for selecting, referencing, and retrieving attributes from an operator graph.

FIG. 1 illustrates one exemplary computing infrastructure 100 that may be configured to execute a stream-based computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

Figure 2:
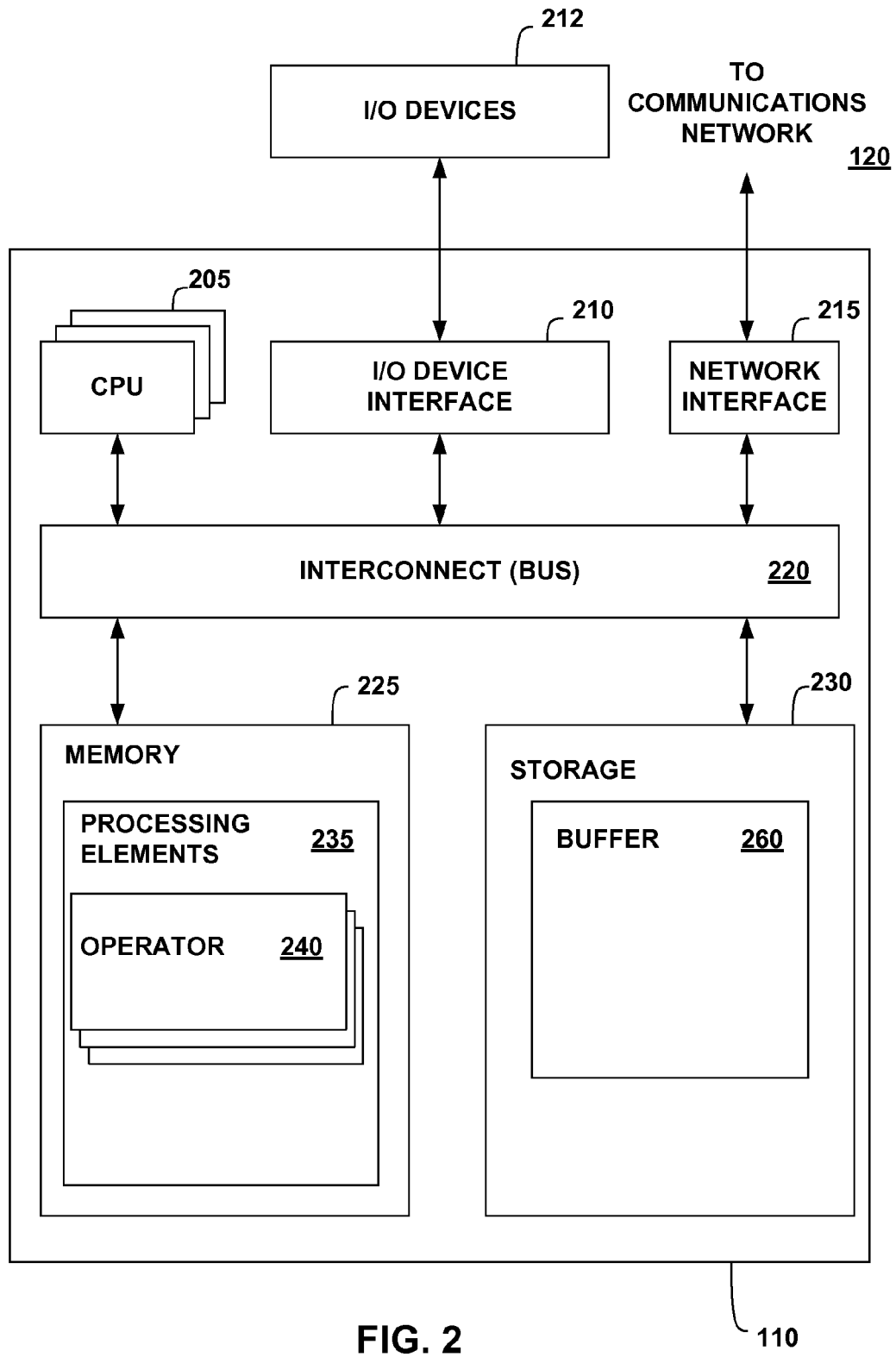
FIG. 2 illustrates a more detailed view of a compute node of FIG. 1, according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A streams application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

Figure 3:
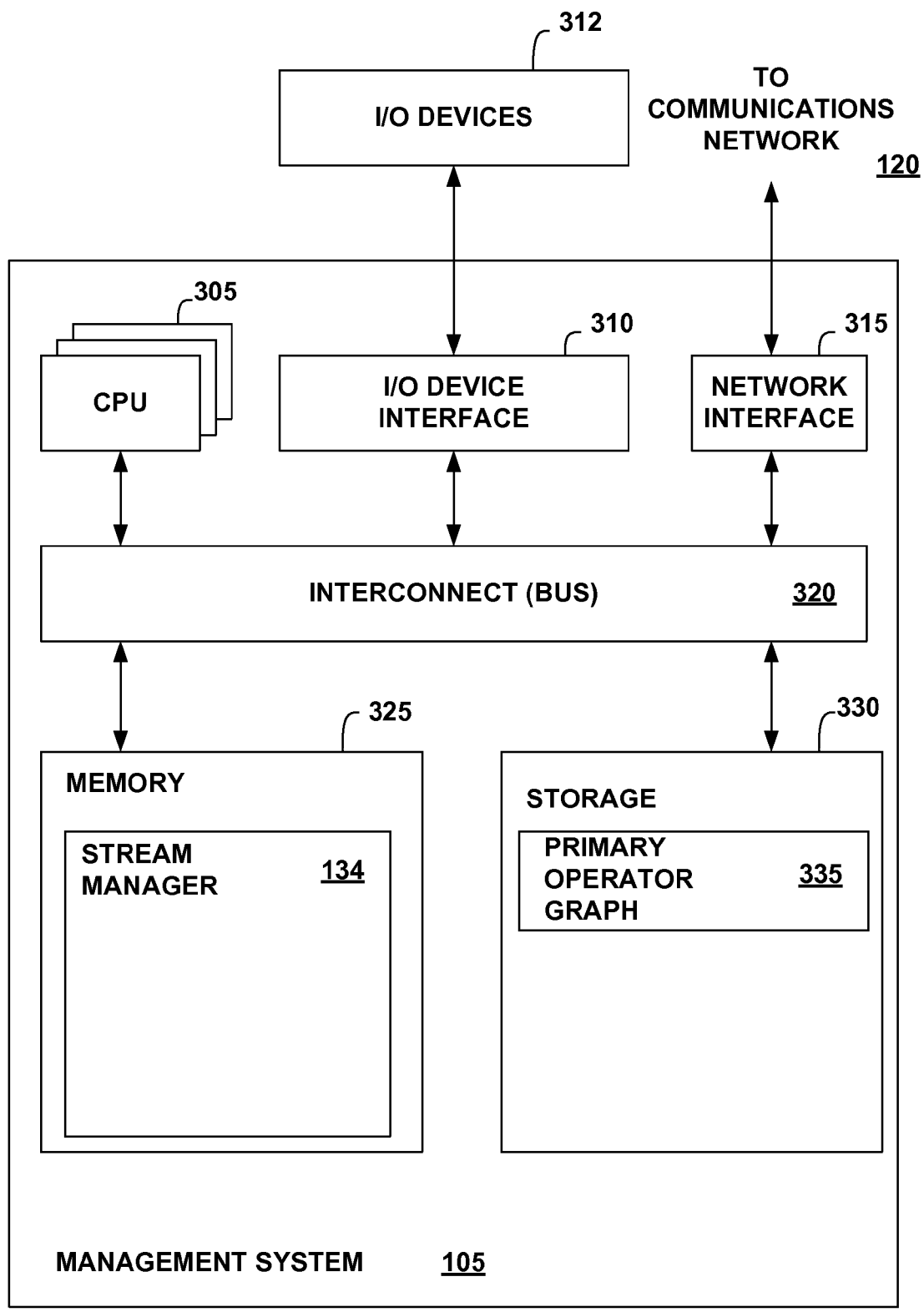
FIG. 3 illustrates a more detailed view of the management system of FIG. 1, according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 305, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing. The stream manager 134 may contain a monitor 340. The monitor 340 may examine the operator graph 132 to determine the amount of data being buffered on a stream operator. The monitor 340 may be a part of the stream manager 134 or act independently and may be discussed further in FIG. 7.

Figure 4:
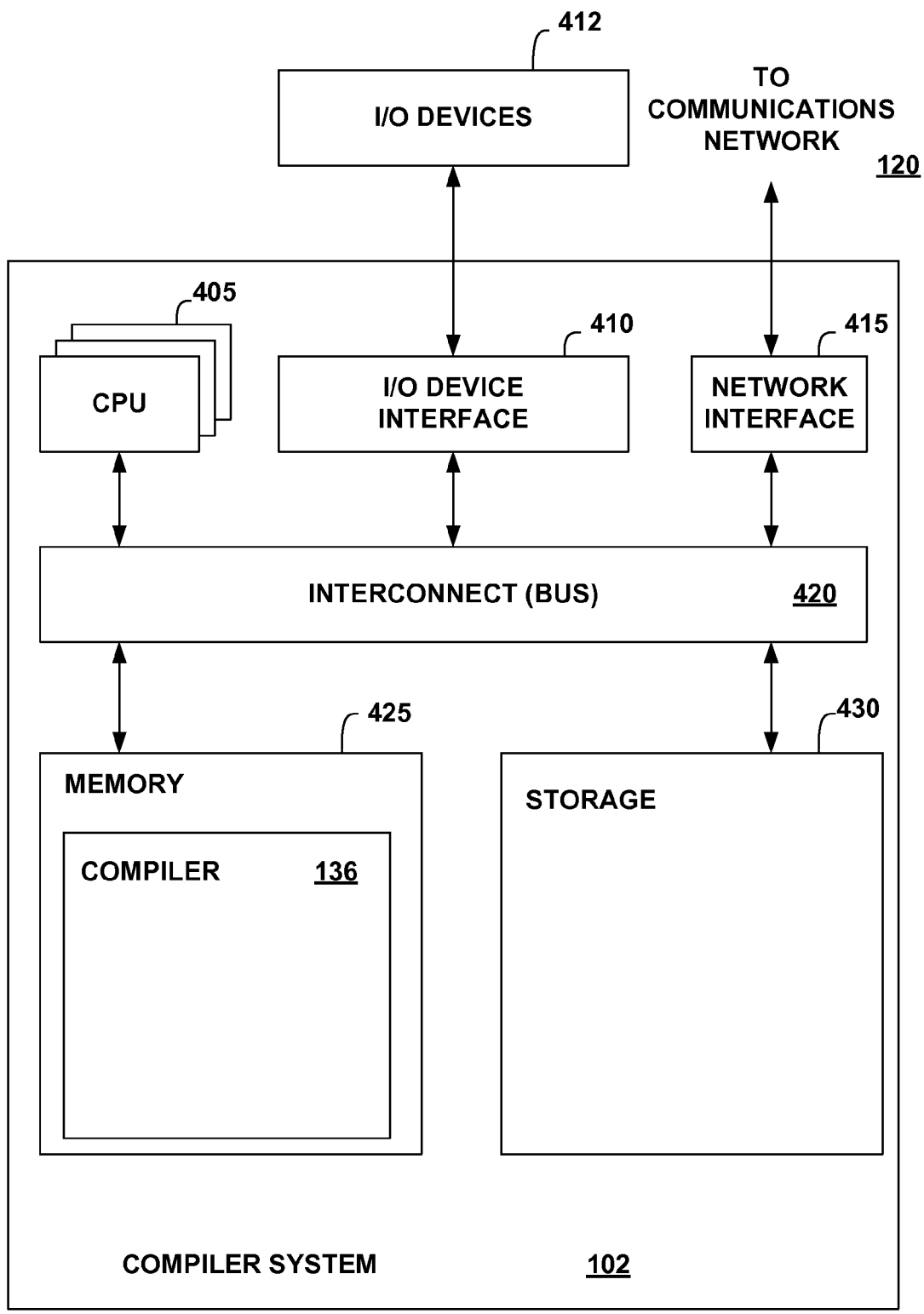
FIG. 4 illustrates a more detailed view of the compiler system of FIG. 1, according to various embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and a storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the streaming application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
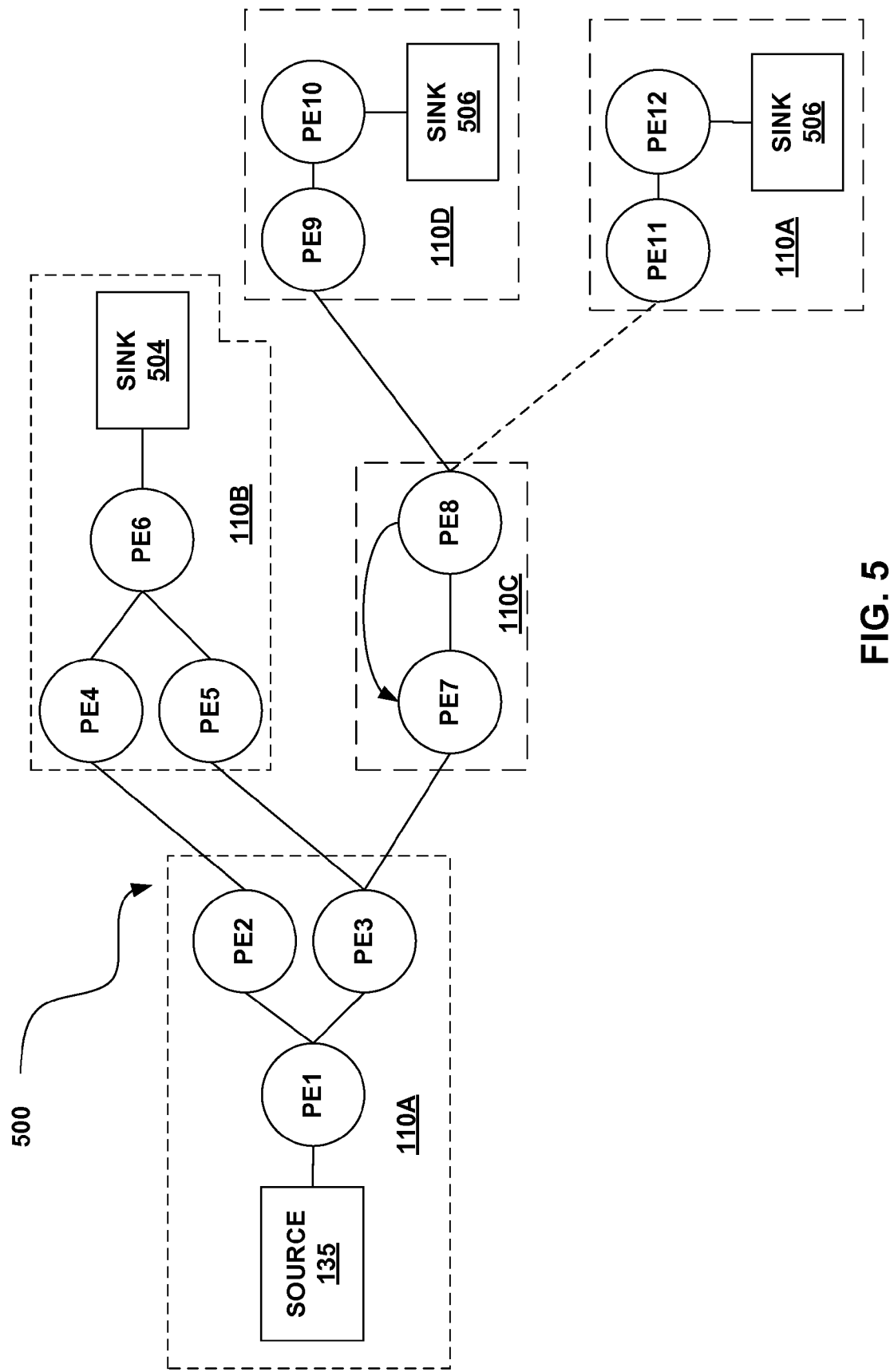
FIG. 5 illustrates an operator graph for a stream computing application, according to various embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins).

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Data that flows to PE2 is processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

The data values contained in attributes of a tuple, which may also be referred to as attribute data values, may be referenced in order to minimize the load on the computing infrastructure 100. A streaming application may transmit a particular attribute many times from stream operator to stream operator. The stream operators may lie on different compute nodes, e.g., 110A-110D which may increase the network load. Some attributes may have large values which make repeated transmission a burden on the computing infrastructure. Referencing the attributes allows a streaming application to avoid repeat transmission of infrequently processed attributes.

During referencing, one or more attributes may be selected for referencing by the stream manager 134. After being selected, the attribute may be stored. Unique identifiers may be created that reference the attribute in storage. The unique identifier may be contained in the tuple in place of the stored attribute. The stored attribute may be stored in a cache. The term cache may be meant to describe the process of providing a non-permanent storage of the stored attribute and may be associated with a hard drive, memory, or other storage location, according to an embodiment. This disclosure may concern reducing load or dependency on the network or other computing infrastructure 100.

Figure 6:
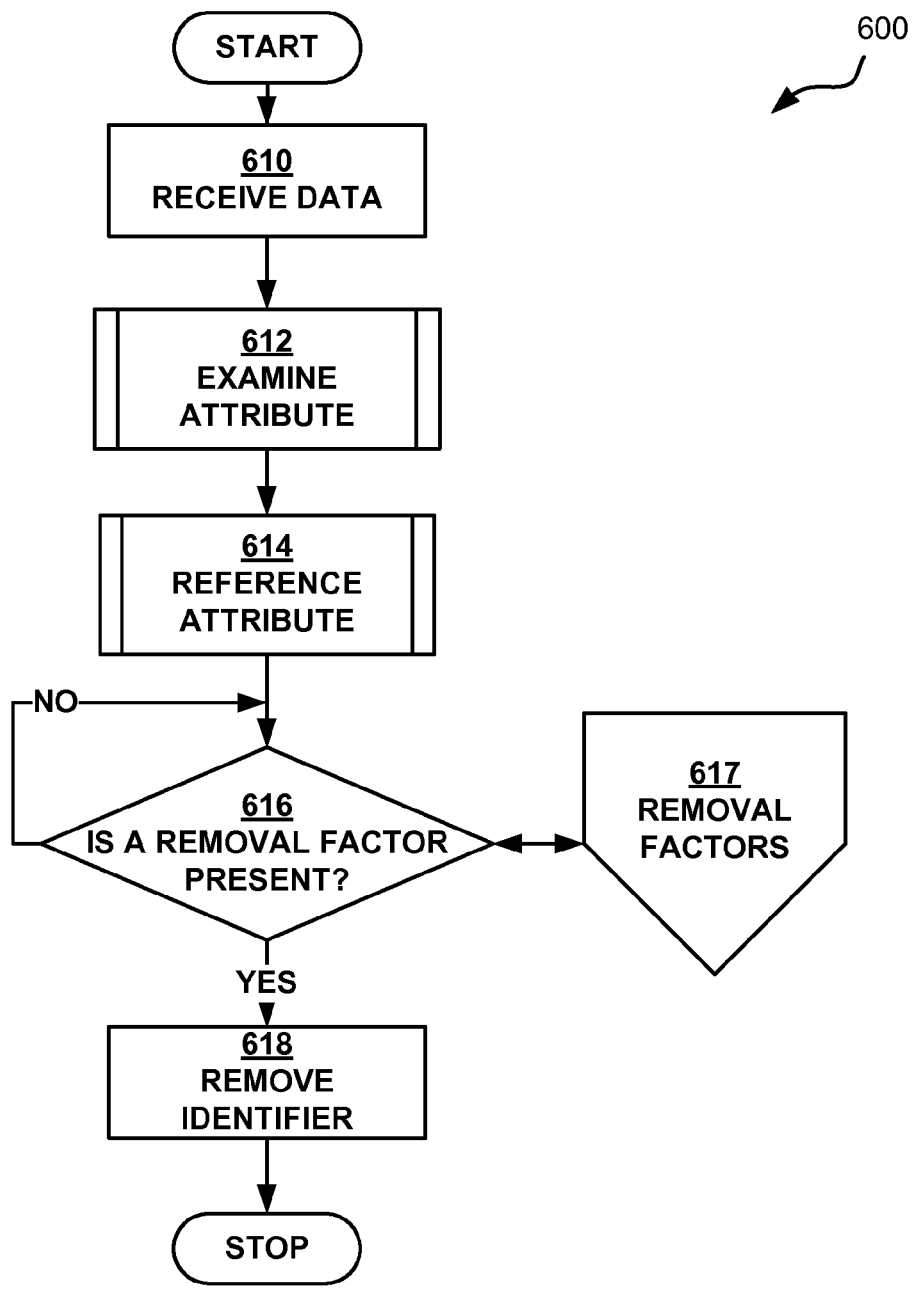
FIG. 6 illustrates a flowchart of a method to reference an attribute, according to various embodiments.
Figure 11:
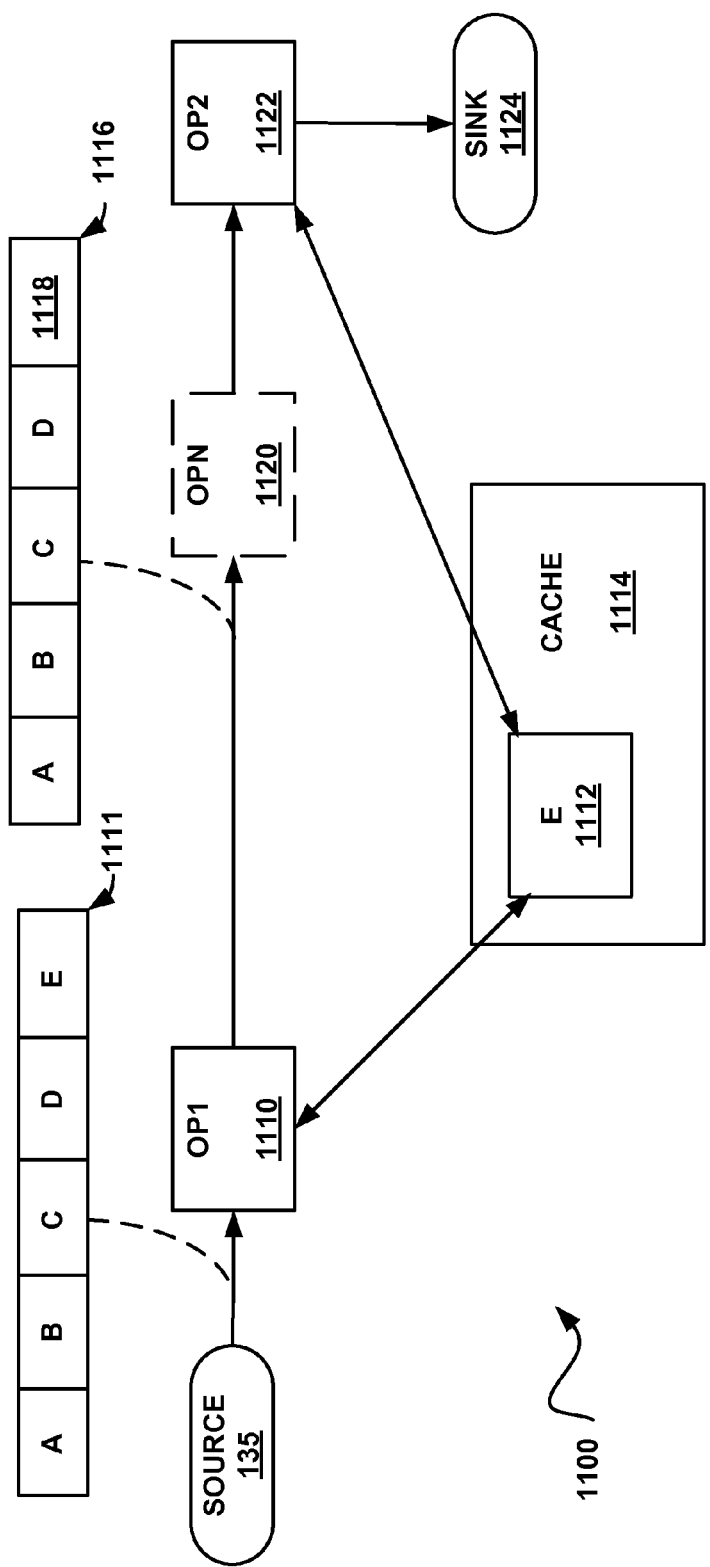
FIG. 11 illustrates an operator graph using unique identifiers in place of attributes, according to various embodiments.

FIG. 6 illustrates a flowchart of a method 600 for selecting, referencing, and dereferencing one or more attributes, according to an embodiment. The method 600 may start at operation 610, where a stream operator receives data from a source, e.g. source 135 on FIG. 11. After a tuple is received by the stream operator, then the attributes of the tuple are further examined in operation 612 (described further in FIG. 7). The attributes that are examined may be referred to as candidate attributes in some embodiments. In operation 612, examination of the attributes may include the process of evaluating attributes to reference and selecting one or more attributes. Even though attributes may be examined at the first stream operator as illustrated in FIG. 11, the attributes may be examined at any stream operator in the operator graph.

In an embodiment, the candidate attributes may be identified for a user to take further action. For example, the stream manager 134 may observe that the candidate attribute is not processed by any stream operators in the operator graph, i.e., where the attribute is stored for reference but not used in processing. In this example, the stream manager 134 may alert the user about the candidate attribute. The user may be an application programmer, or an end user, according to an embodiment.

Figure 8:
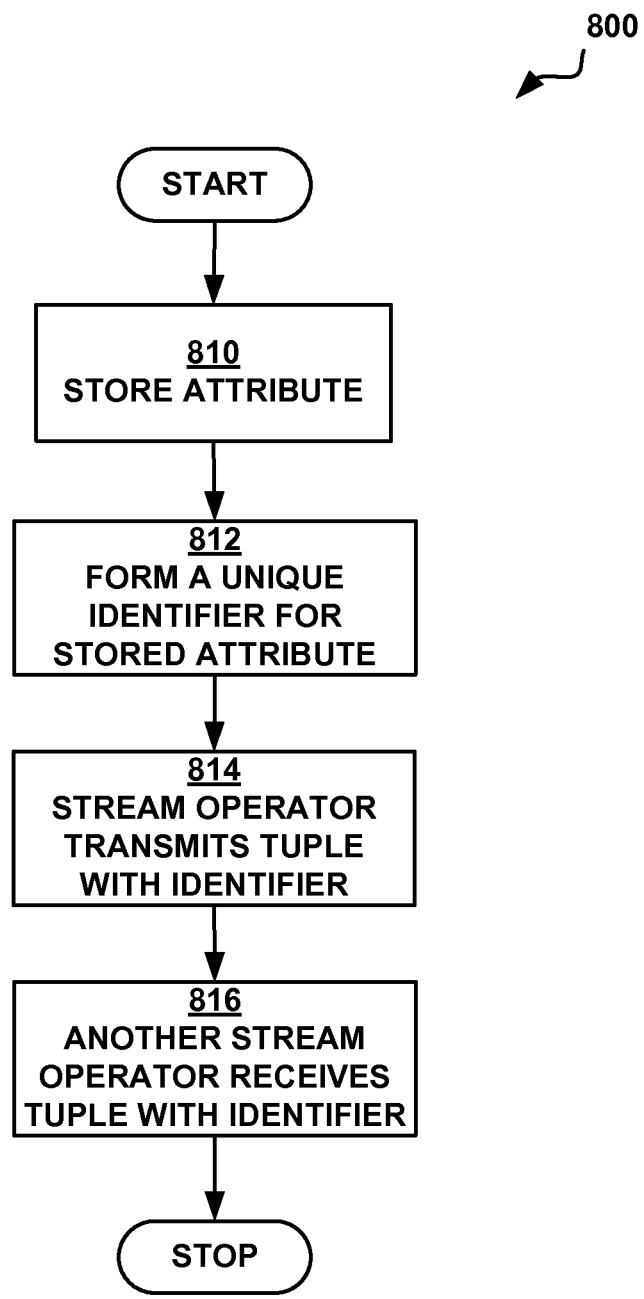
FIG. 8 illustrates a flowchart of a method to form and use a unique identifier, according to various embodiments.

After one or more attributes are selected in operation 612, the attributes may be referenced in operation 614 (which is described further in FIG. 8). In an embodiment, one or more candidate attributes selected in operation 612 may be referred to as the selected attributes. If no attributes are selected, then the method 600 may continue to operation 616. Referencing an attribute may include storing the attribute in a cache and attaching a unique identifier for the attribute to a tuple. The term cache may refer to any temporary storage for attributes and may be on the memory or on a hard drive. The term cache may be used interchangeably with the term storage. The unique identifier may direct a stream operator to the attribute. After the attributes are referenced, then the stream manager 134 may monitor the operator graph to determine if a removal factor 617 is present in operation 616. A removal factor 617 may be a factor that indicates that the referenced attribute should cease to contain a unique identifier. Example removal factors are described further in FIG. 10.

In operation 618, the stream manager 134 may find a removal factor 617 and the unique identifier may be removed from the attribute. The removal may occur by clearing the cache, according to an embodiment. The operation of the cache is described further in FIG. 8. After the unique identifier is removed from the attribute, then the operation may stop. The stream operators may continue to monitor for additional attributes to reference and dereference.

Figure 7:
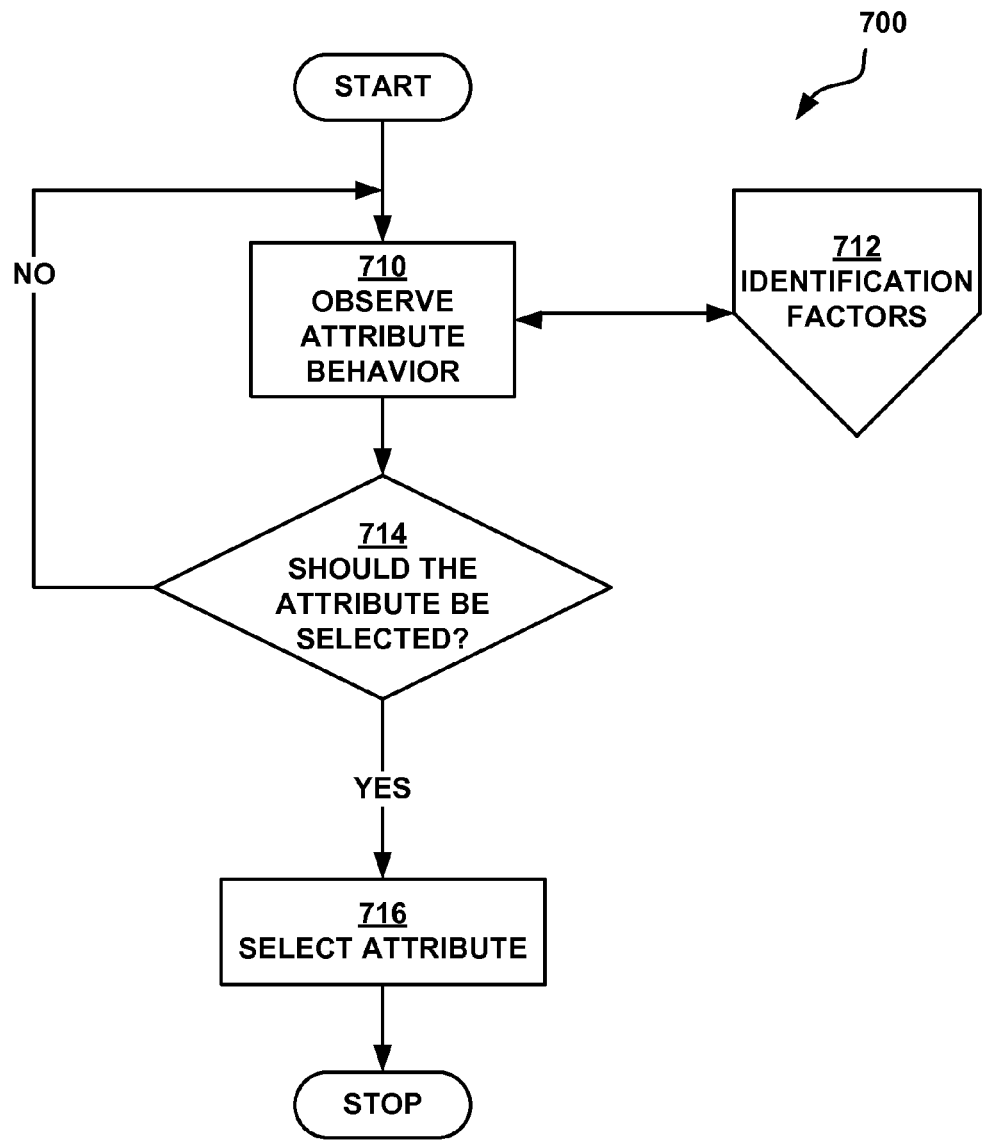
FIG. 7 illustrates a flowchart of a method to examine attributes for possible referencing, according to various embodiments.

FIG. 7 illustrates a flowchart for a method 700 to identify whether the candidate attribute should become a selected attribute, according to various embodiments. FIG. 7 may correspond to operation 612 in FIG. 6. The operation 612 in FIG. 6, may start with operation 710, where one or more stream operators observes the attributes of a tuple for identification factors 712 (described more fully in FIG. 9). For example, if an operator graph contains three stream operators, then each of the three stream operators may observe the behavior of a tuple at various parts of the operator graph. In the mentioned example, a stream operator from the three stream operators may separately notify the stream manager 134 that a particular attribute is not processed. The stream manager 134 may compile the data from one or more stream operators. In another embodiment, the stream operators may individually compile attribute usage data. In some embodiments, the code that resides on the stream operator may originate from the stream manager 134.

After the attributes are observed in operation 710 for the identification factors 712, then the method 700 may proceed to operation 714. In operation 714, the stream manager 134 may determine if an attribute should be selected. Operation 714 may be determined by also determining if the candidate attribute will improve performance. The stream manager 134 may select the candidate attribute based on the performance prediction of the identification factors 712. The performance improvement prediction may refer to either improvement of the computing infrastructure, e.g., network bandwidth, or improvement of the operator graph, e.g., if less time delay results from the operator graph avoiding processing of an attribute.

To determine if the candidate attribute should become a selected attribute, the stream manager 134 may perform a prediction, e.g., by running a simulation, or using historical results. When the stream manager 134 uses historical results, the stream manager 134 may look at the performance impact of a similar attribute on stream operators. For example, the stream manager 134 may determine the effect on an unprocessed image file of approximately the same size in prior tuples to predict how processing the attribute affected the stream operators. If the impact on the computing infrastructure is high, e.g., when the network load becomes too high, then the stream manager 134 may determine that the unprocessed image file attribute should be referenced. In operation 714, if the proposed attribute will not improve the performance of the computing infrastructure, then the analysis may revert to operation 710.

Once an attribute is selected, then the operation may proceed to operation 716. In some embodiments, the stream manager 134 may attach a unique identifier to the attribute, e.g., a marker or otherwise segregate the attribute from the tuple. In other embodiments, the stream manager 134 may direct the stream operator to reference the attribute according to operation 614 in FIG. 6 or operation 1210 in FIG. 12.

FIG. 8 illustrates a flowchart of method 800 which corresponds to operation 614 in FIG. 6, where a selected attribute is referenced, according to an embodiment. The method 800 may start at operation 810. In operation 810, the selected attribute is stored by a stream operator. The attribute may be stored in a local cache or in a global cache. The local cache may be connected to a single stream operator, in an embodiment. The global cache may be connected to one or more stream operators and may be shared. In an embodiment, the stream operator may control access to the attribute residing in either the local cache or global cache. In another embodiment, the attribute may be stored in memory in a non-cache configuration, e.g., a database. In another embodiment, the stream manager 134 may control access to the global cache or the local cache. In another embodiment, the attribute may be marked but not stored in the cache. In this embodiment, the cache may not be required and the storage operation 810 may be skipped (discussed further on FIG. 12).

After operation 810, the method 800 may proceed to operation 812. In operation 812, a unique identifier may be formed for the stored attribute. In some embodiments, the unique identifier may be formed before the attribute is stored, i.e., it may be possible to create the unique identifier before storing the attribute in the cache or other location, e.g. on a hard drive or separate database. In some embodiments, the unique identifier may allow stream operators to access either the local or global cache. In other embodiments, the unique identifier may alert the operator graph about the attribute associated with the unique identifier.

Once the unique identifier is formed, the unique identifier may be associated with the selected attribute in the cache in an identifier table. In some embodiments, the identifier table may include a listing of unique identifiers, the selected attributes to which the unique identifiers point, and the location of the selected attributes. In some embodiments, the selected attributes may not be in the same location, e.g., the selected attributes may reside in different caches. The unique identifier may also be formed after the identifier table is created, according to an embodiment. After a unique identifier is formed, the method 800 may proceed to operation 814. In operation 814, the stream operator may transmit the tuple with the unique identifier as described in FIG. 11.

In operation 816, a stream operator, e.g., a downstream stream operator, may receive the tuple with the unique identifier. The unique identifier may reference the attribute held by the stream manager 134. In some embodiments, the stream operator may retrieve the attribute from the cache and process the identifier. In another embodiment, the stream operator may connect the attribute with the tuple. In another embodiment, the stream operator may receive the unique identifier and avoid processing of the attribute, e.g., when the attribute is not required by the stream operator. After operation 816, the operation may proceed to operation 616 in FIG. 6.

Figure 9:
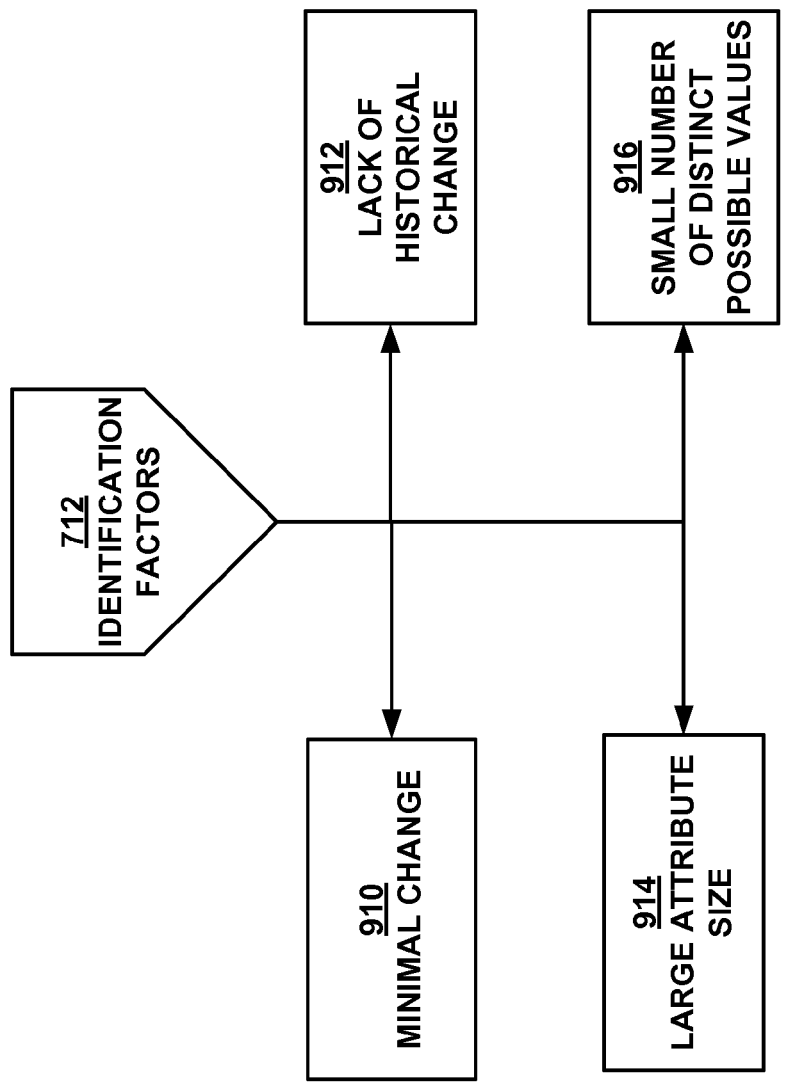
FIG. 9 illustrates identification factors for examining attributes for possible referencing, according to various embodiments.

FIG. 9 illustrates some identification factors that may be used by the stream operator in operation 712 in FIG. 7, according to various embodiments. The identification factors may be included in a separate configuration file, as part of the stream operator, or part of the stream manager 134. In some embodiments, the identification factors may be stored on one or more stream operators using code from the stream manager 134. The user may attach a weight to any particular identification factor 712 to allow operation 710 to proceed. For example, the user may determine that reducing the network load is a priority and may assign a higher weight to attributes with large file sizes than attributes that are not frequently processed. The stream manager 134 may take the relative weight of each factor and rank the factors. The identification factors 712 may include minimal change of attributes 910, a lack of historical change 912, attribute size 914, or a small number of distinct possible values 916.

The minimal change of attributes factor 910 may occur when an attribute does not change or has a small amount of change from the original attribute when processed through one or more stream operators. For example, if the attribute is an image file that is kept for reference, then the attribute may not change as it is transmitted from one stream operator to another. Another example of factor 910 may include body temperature readings from a mammal. The body temperature attribute may be processed minimally and be there mainly for reference.

The lack of historical change factor 912 may occur when the stream manager 134 predicts that a tuple attribute will not change based on processing of previous tuples. For example, a screenshot of video security footage of a backdoor may remain unchanged historically between the hours of 0300 and 0600. In an embodiment, the stream manager 134 could reference all of the frames that are identical from the security footage, but not the frames that show a person entering a doorway.

The large attribute size factor 914 may occur when an attribute has a large file size. For example, the factor 914 may exist for video files or high-resolution image files, where the network bandwidth used for processing the attribute between stream operators is more than the number of times that the attribute is processed by the stream operators. Factor 914 may also have a threshold defined by the user. For example, the user may desire that all files over 4 MB must be referenced.

The small number of distinct possible values factor 916 may occur when the number of possible values is finite and the operator graph is using a portion of the values. An example of factor 916 may be a default online profile photo. The default profile photo may be the same for a large number of online profiles for a particular site. When processing the tuple, a large number of profile photo attributes may have the same default profile photo attribute. In this example, the stream operator may save network bandwidth by referencing the default profile photo attribute. Another example of factor 916 may be zip codes. As an example, if the operator graph is set up to retrieve address information from a state department of motor vehicle database, then larger metropolitan areas would have more zip codes represented than rural areas. The stream manager 134 may determine that factor 916 exists for the zip codes for the metropolitan areas. Other examples of factor 916 include male and female attributes, states, or provinces.

Figure 10:
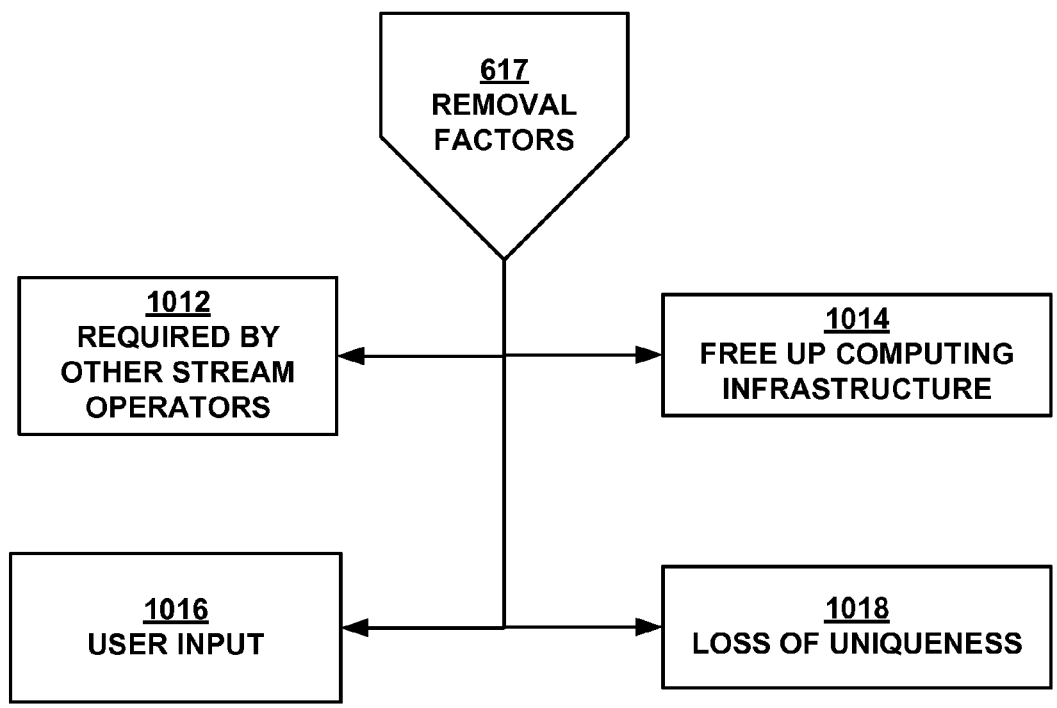
FIG. 10 illustrates removal factors that are used to determine whether to remove a unique identifier from a tuple, according to various embodiments.

FIG. 10 illustrates a list of removal factors 617 that may be used in operation 616 in FIG. 6, according to various embodiments. An attribute may be removed from the cache and no longer referenced if it is required by other stream operators 1012, to free up computing infrastructure 1014, based on user input 1016, or loss of uniqueness 1018.

The removal factor 1012 may be present where the stream operator needs to modify the attribute in the cache. For example, if the attribute is a color image that needs to be converted to a black and white image, the stream manager 134 may determine that factor 1012 is present.

The removal factor 1014 may be present when computing resources may be freed. For example, if the memory to hold the cache is constrained, i.e., not enough memory in the system, then one or more attributes may be removed from the cache to free up additional memory. The stream manager 134 may determine that factor 1014 is present. In other embodiments, the removal factor 1014 may be present on less than all of the attributes in a constrained cache. For example, the user or stream manger 134 may prioritize one or more attributes to stay in the cache. In some embodiments, the priority may be based on the amount of network bandwidth or other computing infrastructure 100. Factor 1014 may also be present when there is a high rate of data being processed by the stream operator. For example, when there are too many referenced attributes that may cause the memory to become overloaded, then the stream manager 134 may start removing attributes from the cache.

Removal factor 1014 may also occur in a non-constrained environment. When there is no need to modify the attribute in the cache, the absence of amount of times that the attribute is accessed may contribute to the removal factor 1014. For example, if an image attribute is stored in the cache and is accessed only twice per hour, then the stream manager 134 may determine that the bandwidth savings are minimal and factor 1014 is present. Similarly, if the image attribute causes processing lag because it is accessed too frequently by stream operators on the same compute node, then the stream manager 134 may determine that the network bandwidth savings are offset by the increased processing lag time.

The removal factor 1016 may be present based on user input. In an embodiment, the user may prioritize any of the removal factors 617. For example, the user may assign a high removal priority to attributes with a large file size during high demand hours. The user may also set a time parameter for the length of time that the attribute is held in the cache. The user may set the time parameter in order to ensure that the cache is not overloaded. The user may also reset the cache based on a time parameter.

The removal factor 1018 may be similar to factors that cause a constrained computing infrastructure. Removal factor 1018 may be present when the attribute is accessed on multiple stream operators and the cost of the processing delay associated with accessing the unique identifier is greater than a benefit of saving on network bandwidth. For example, if the cache references a particular zip code attribute, but the zip code is frequently accessed by every one of the subsequent stream operators, then the referenced attribute may no longer be unique.

FIG. 11 illustrates an operator graph 1100 that may create a unique identifier for an attribute, according to various embodiments. To illustrate the embodiment, an example of a toll booth receiving license plate data from passing cars will be used. The operator graph 1100 may receive one or more tuples from a source 135 at stream operator 1110. One of the tuples 1111 has attributes A, B, C, D, and E for each car that passes through the tollbooth. In the above example, the A attribute may represent the time that car entered the tollbooth, the B attribute may represent the speed of the car going through the toll booth, the C attribute may represent the color of the car, the D attribute may represent the amount of toll paid, and E attribute may represent a photograph of the license plate. Although, only attribute E is referenced in this example, there may be more than one attribute that is referenced in a tuple.

The tuple 1111 may be received by stream operator 1110. Stream operator 1110 may process one or more attributes that does not involve processing attribute E, e.g., averaging the speed of cars going through the tollbooth. The stream operator 1110 may access a cache 1114 and store attribute E into the cache 1114 as described in FIG. 6. In the shown configuration, the cache 1114 is global and may be accessed by any stream operator in the operator graph 1100. In other configurations, the cache 1114 may be local and other stream operators may request permission from stream operator 1110 for access. In another embodiment, performance may be improved when the cache lies on the same compute node as either the originating stream operator, e.g., stream operator 1110, or as a stream operator that accesses the cache, e.g., stream operator 1122. Having the same compute node shared by both the cache and the accessing stream operator may reduce the network bandwidth required to fetch the attribute from the cache.

In an embodiment, the stream operator 1110 may select an attribute E, e.g., in operation 716. The stream operator 1110 may then store attribute E 1112 in the cache 1114 as in operation 810, and form a unique identifier, e.g., unique identifier 1118, as in operation 812. The unique identifier 1118 may be transmitted with the tuple 1116 (herein referred to as the identifier-substituted tuple) in place of attribute E, which may increase bandwidth. The stream operator 1110 may then transmit the identifier-substituted tuple 1116 with the unique identifier 1118, as in operation 814. The identifier-substituted tuple 1116 may encounter stream operator 1120 which may read the unique identifier 1118, but not process attribute E 1112. Since there is minimal processing of attribute E 1112, the stream operator 1120 may not be required to access the cache 1114. Stream operator 1120 is represented as a single stream operator but may include one or more stream operators that do not require processing of attribute E 1112.

After stream operator 1120 transmits the identifier-substituted tuple 1116, then another stream operator that requires attribute E, e.g., stream operator 1122, may receive the identifier-substituted tuple 1116. In an embodiment, the stream operator 1122 may require processing from the attribute 1112 and may read the unique identifier 1118 from the identifier-substituted tuple 1116. Using the tollbooth example as an illustration, the stream operator 1122 may be a stream operator that transcribes the license plate from the image. The stream operator 1122 may read the unique identifier 1118 and the unique identifier may indicate to the stream operator 1122, that the attribute 1112 is held in the cache 1114. In other embodiments, the unique identifier 1118 may indicate the location of attribute E, if not in the cache 1114. In other embodiments, the unique identifier 1118 may point to another stream operator, e.g. stream operator 1110, that may access attribute E, e.g., in a local configuration. In some embodiments, the unique identifier 1118 may point to a database where the attribute 1112 is contained.

The stream operator 1122 may retrieve the attribute 1112 from the cache 1114 using the unique identifier 1118. The stream operator 1122 may transfer the attribute E 1112 file from the cache 1114 to the stream operator 1122, according to an embodiment. In some embodiments, the stream operator 1122 may remove attribute E 1112 from the cache 1114 upon accessing the attribute 1112. Removing attribute E 1112 from the cache 1114 may occur, in some embodiments, by removing all attributes in the cache. In other embodiments, the stream operator 1122 may remove only attribute E 1112 from the cache. The stream operator 1122 may remove the unique identifier using a call back routine, according to various embodiments. The processed tuple may be transmitted to a sink 1124.

In some embodiments, the stream operator 1122 may update the stored attribute 1112 with a processed copy. For example, using the tollbooth example, after the stream operator 1122 processes the license plate information from the image, the processing may include enhanced contrast of the license plate image in order to transcribe the license plate. Updating the stored attribute may involve the stream operator 1122 uploading the image with enhanced contrast of the license plates to the cache 1114 in place of the image of the license plate. In other embodiments, the updating of the stored attributes may contribute to the removal factors on FIG. 9.

Figure 12:
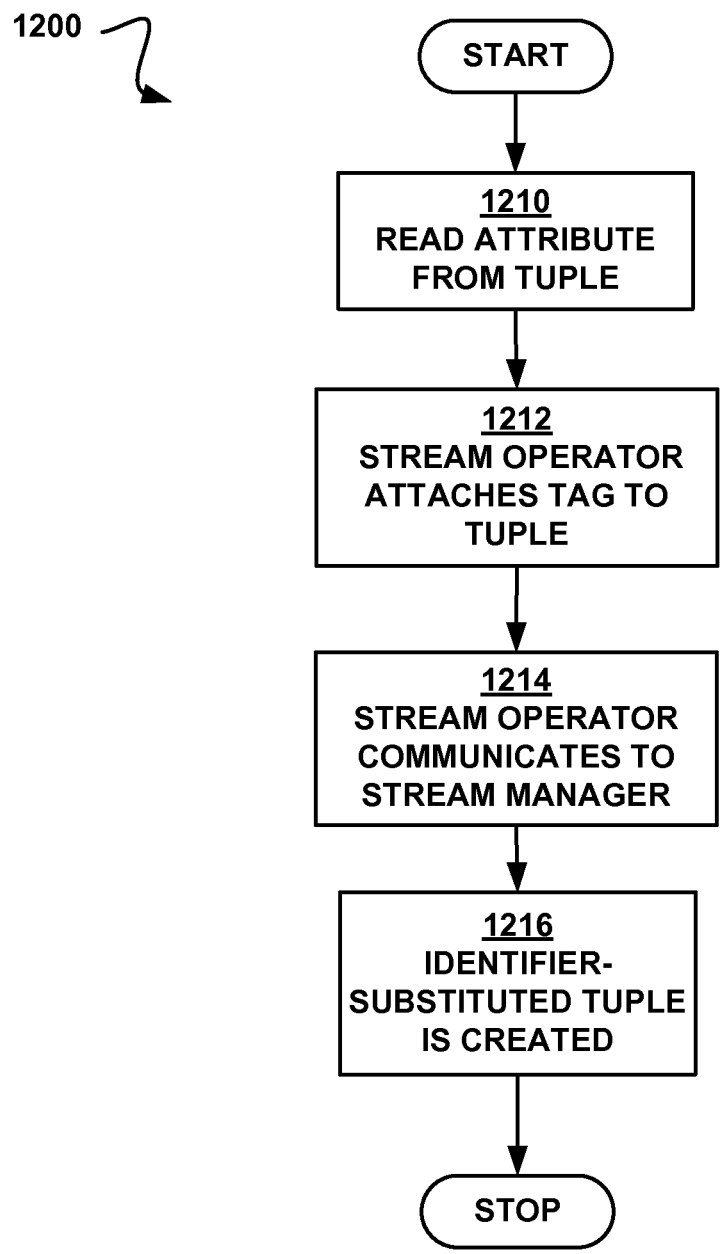
FIG. 12 illustrates a flowchart of a method to create a tag to reference an attribute without using a cache, according to various embodiments.

FIG. 12 illustrates a flowchart of a method 1200 to attach a tag that allows a unique identifier to reference an attribute contained in another tuple without the use of a cache, according to an embodiment. The stream manager 134 may use the tag to track the selected attribute in the operator graph, according to an embodiment. A stream operator may retrieve the selected attribute with the tag while the selected attribute is in the stream of tuples. The term tag may be used interchangeably with the term first identifier. Method 1200 may occur in place of method 700 in FIG. 7. The method 1200 may allow the selected attribute to be tagged in a first tuple and then a reference may be created using a unique identifier in a second tuple. The unique identifier in the second tuple may reference the attribute with the tag contained in the first tuple. In some embodiments, the term unique identifier may be used interchangeably with the term second identifier since the unique identifier may be produced after the first identifier.

The method 1200 may begin at operation 1210 where a first tuple is received by a first stream operator. At the first stream operator, the selected attribute may be read from the tuple. The first stream operator may be any stream operator in the operator graph that receives a tuple with the selected attribute and may include more than one stream operator. The operation may proceed to operation 1212, where the first stream operator attaches a tag to the selected attribute in the first tuple. The tag may include a callback mechanism that allows the stream manager 134 to track the first tuple through the operator graph. The tag may be associated with either the attribute or the first tuple. In addition, there may be one or more tags in the first tuple.

After the tag is attached to the first tuple, the first stream operator may communicate with the stream manager 134 in operation 1214. In operation 1214, the stream manager 134 may store the attribute information along with the tag information. For example, the first stream operator 134 may assign a tag A to refer to a particular zip code on the first tuple, the stream manger 134 may search a table, e.g., an identifier table, and note that tag A corresponds to that particular zip code or a shorthand identifier such as a unique number.

Operation 1216 may involve creating a second tuple with a unique identifier substituted for an attribute. The substitution may occur upstream from the first stream operator or at the first stream operator with the tag information obtained from the stream manager 134. For example, if the selected attribute is a default profile image, then the default profile image may be substituted for a unique identifier at any point before it is processed by the first stream operator or while it is processed by the first stream operator. The first stream operator may not require processing of the selected attribute, according to an embodiment. The example may occur at the source or at any point before the first stream operator or at the first stream operator. In some embodiments, the stream manger 134 may direct another upstream stream operator to create the unique identifier or another part of the operator graph. In another embodiment, the unique identifier may replace the attribute in the second tuple before the second tuple is created.

Figure 13:
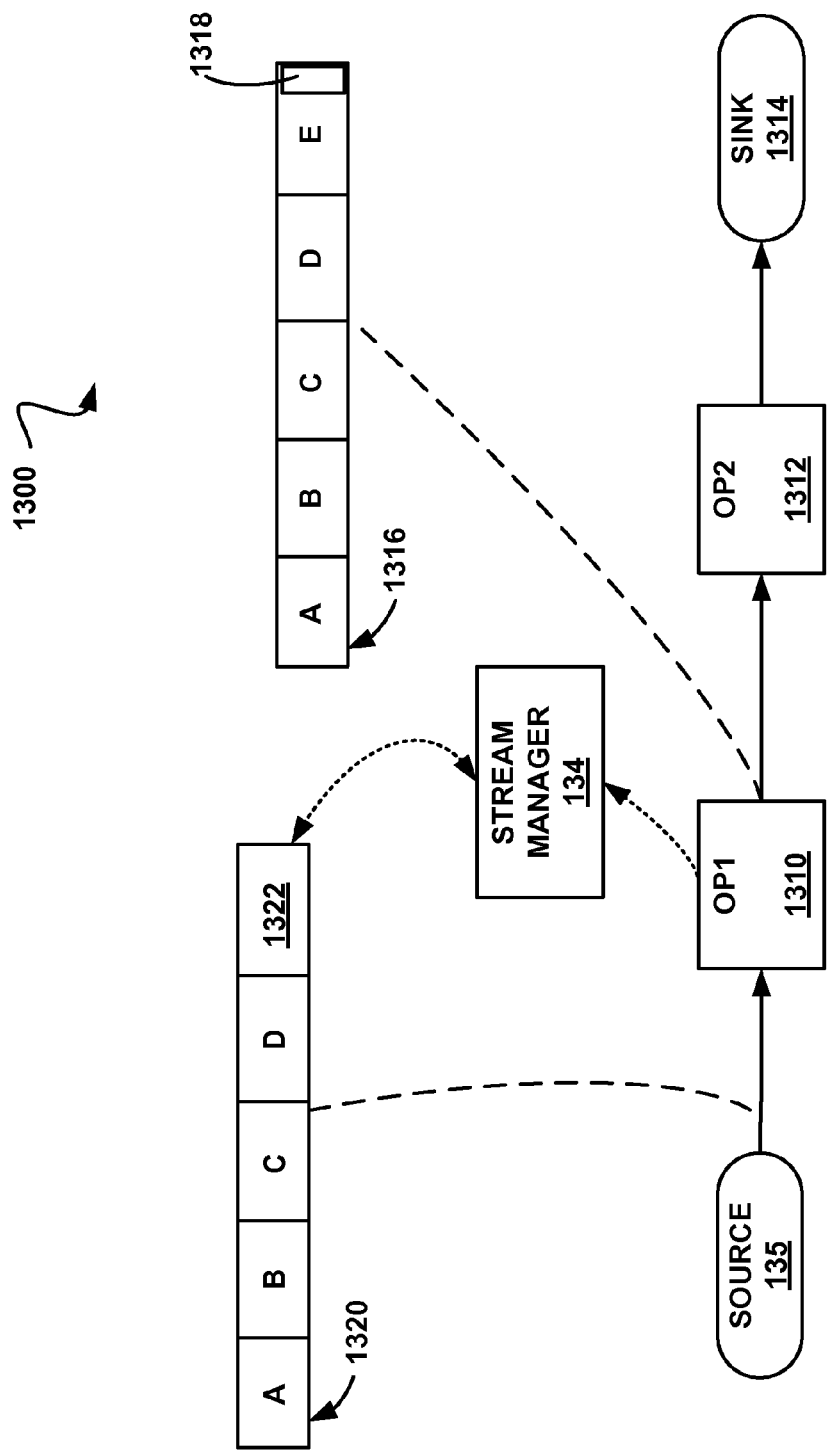
FIG. 13 illustrates an operator graph for creating a tag to reference an attribute without using a cache, according to various embodiments.

FIG. 13 illustrates an operator graph 1300 that may create a unique identifier that references a selected attribute in a tuple within the stream, according to various embodiments. The operator graph 1300 may be used to illustrate the flowchart 1200 described in FIG. 12. The operator graph 1300 may contain a source 135 with a stream of tuples. The stream of tuples may be received by a first stream operator 1310 and then transmitted to a second stream operator 1312. The second stream operator 1312 may transmit the stream of tuples to a sink 1314

The first stream operator 1310 may receive a first tuple 1316 from the source 135. The first tuple 1316 may have five attributes, A, B, C, D, and E. The first stream operator 1310 may read attribute E and consult the stream manager 134. In an embodiment, the stream manager 134 may indicate to the first stream operator 1310 that attribute E is a selected attribute from operation 716 on FIG. 7. The first stream operator 1310 may attach a tag 1318 to attribute E on the first tuple 1316, similar to operation 1212 on FIG. 12.

The first stream operator 1310 may also communicate to the stream manager 134 the presence of the tag. In an embodiment, the stream manager 134 may receive a location of the first tuple 1316 as it remains in the operator graph 1300. In another embodiment, the stream manager 134 may receive the location of the first tuple 1316 as the first tuple 1316 passes through stream operators, e.g., stream operator 1312, in the operator graph 1300.

The source 135 may transmit a second tuple 1320. The second tuple 1320 may have attributes A, B, C, and D, similar to the first tuple 1316. However, the second tuple 1320 may have a unique identifier 1322 instead of attribute E. The unique identifier 1322 may be attached by an upstream operation, e.g., an upstream stream operator, or at the data source 135. The stream manager 134 may substitute the unique identifier 1322 for the attribute E on the second tuple 1320.

Figure 14:
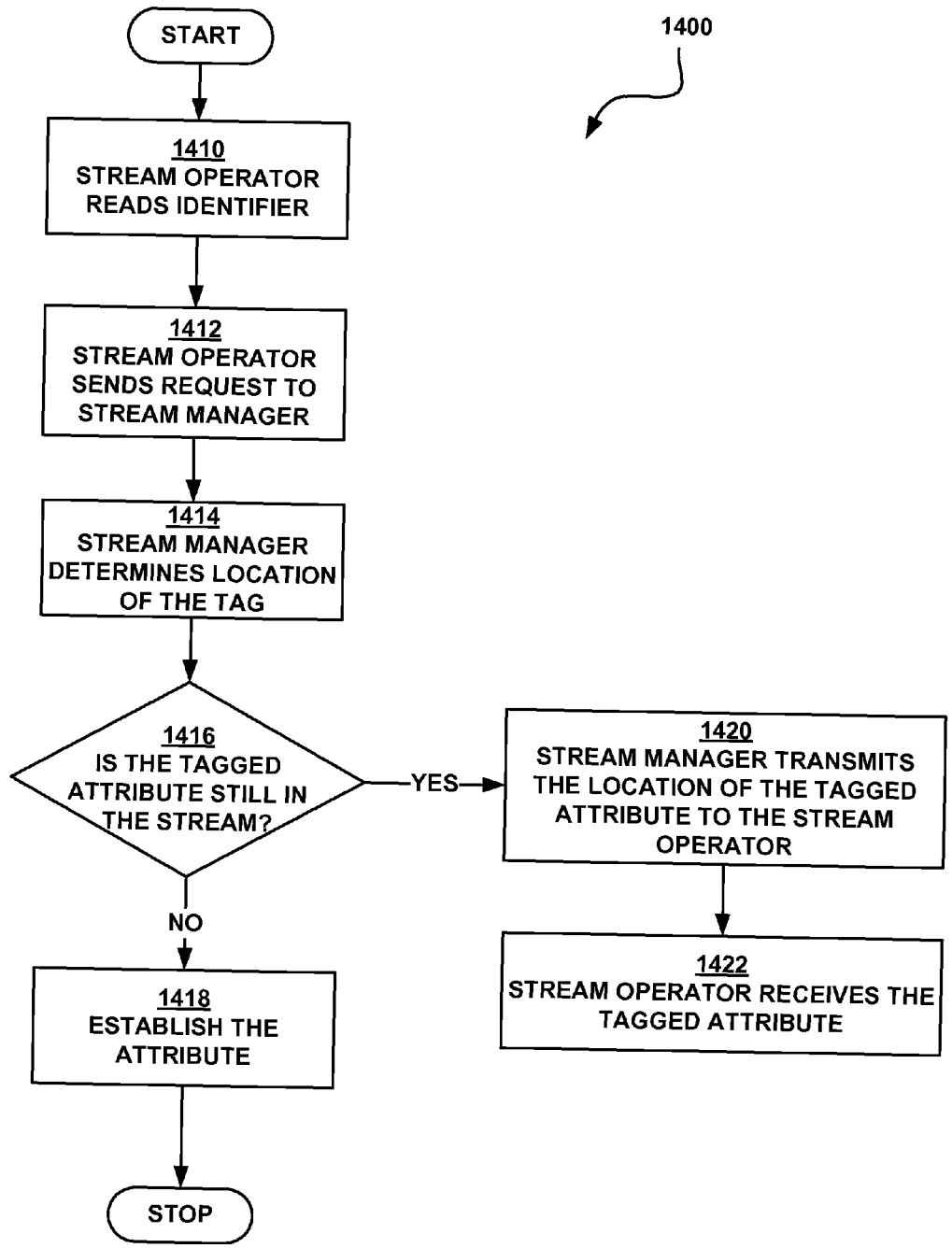
FIG. 14 illustrates a flowchart of a method to use a unique identifier to retrieve an attribute with a tag, according to various embodiments.

FIG. 14 illustrates a flowchart of a method 1400 to use the unique identifier to access the attribute contained in the first tuple at a first stream operator, according to an embodiment. The method 1400 may begin at operation 1410. In operation 1410, a second stream operator may read the unique identifier from the second tuple. In an embodiment, the second stream operator may require processing of the selected attribute. After operation 1410, the method 1400 may proceed to operation 1412. In operation 1412, the second stream operator may send a request to the stream manager 134 for the location of the first tuple with the tag.

In operation 1414, the stream manager 134 may determine the location of the tagged first tuple by a callback mechanism on the tag. The callback mechanism may alert the stream manager 134 to the location of the first tuple at any frequency. In some embodiments, the frequency of alerts may be adjustable. For example, the first tuple may report its position on the operator graph every 3 ms. If the tuple is in the middle of a process, the stream manager 134 may wait for position location from the first tuple. In another embodiment, the stream manager 134 may push the location data of the first tuple to the second stream operator.

After the location of the tag is determined in operation 1414, the operation may proceed to operation 1416. In operation 1416, the stream manager 134 may determine if the tag is still in the stream of tuples or otherwise in the operator graph. In some embodiments, the operator graph may complete processing of the first tuple before the second tuple. In this example, the second tuple may not be able to reference the tagged attribute. In the absence of the tag in the stream of tuples, the operation may proceed to operation 1418.

In another embodiment, the stream manager 134 may substitute the unique identifier with the selected attribute if the tag is no longer in the operator graph or is at a final stream operator in the operator graph. In an embodiment, operation 1418 may proceed with the stream manager 134, or a stream operator, substituting the unique identifier with the selected attribute with a tag by first copying the selected attribute in the first tuple into a cache, then using the cache to copy the selected attribute into a tuple with the unique identifier.

In another embodiment, operation 1418 may proceed by the stream manger 134 receiving an indication that the tag is about to leave the operator graph, e.g., the tag is found at the last downstream stream operator. The stream manager 134 may use the tag to send the attribute to one or more of the second tuples in the operator graph. For example, if there are 3,000 tuples in the operator graph that have the selected attribute, and the tag is at the last downstream stream operator, then the stream manager 134, or the stream operators, may replace the unique identifier with a copy of attribute E for 3,000 tuples. In another embodiment, the stream manager 134 may replace the unique identifier with a copy of the tag for the second tuple closest to the first tuple.

If the tag is still in the stream of tuples or in the operator graph, then the operation may proceed to operation 1420. In operation 1420, the stream manager 134 may transmit the location for the tag to the second stream operator. The stream manager may confirm the request with the second stream operator, according to an embodiment. In operation 1422, the second stream operator receives attribute E. In some embodiments, the transmission of attribute E may occur through the stream manager 134. In other embodiments, the attribute E may be transmitted by a downstream operator. Attribute E may be retained by the first tuple.

Figure 15:
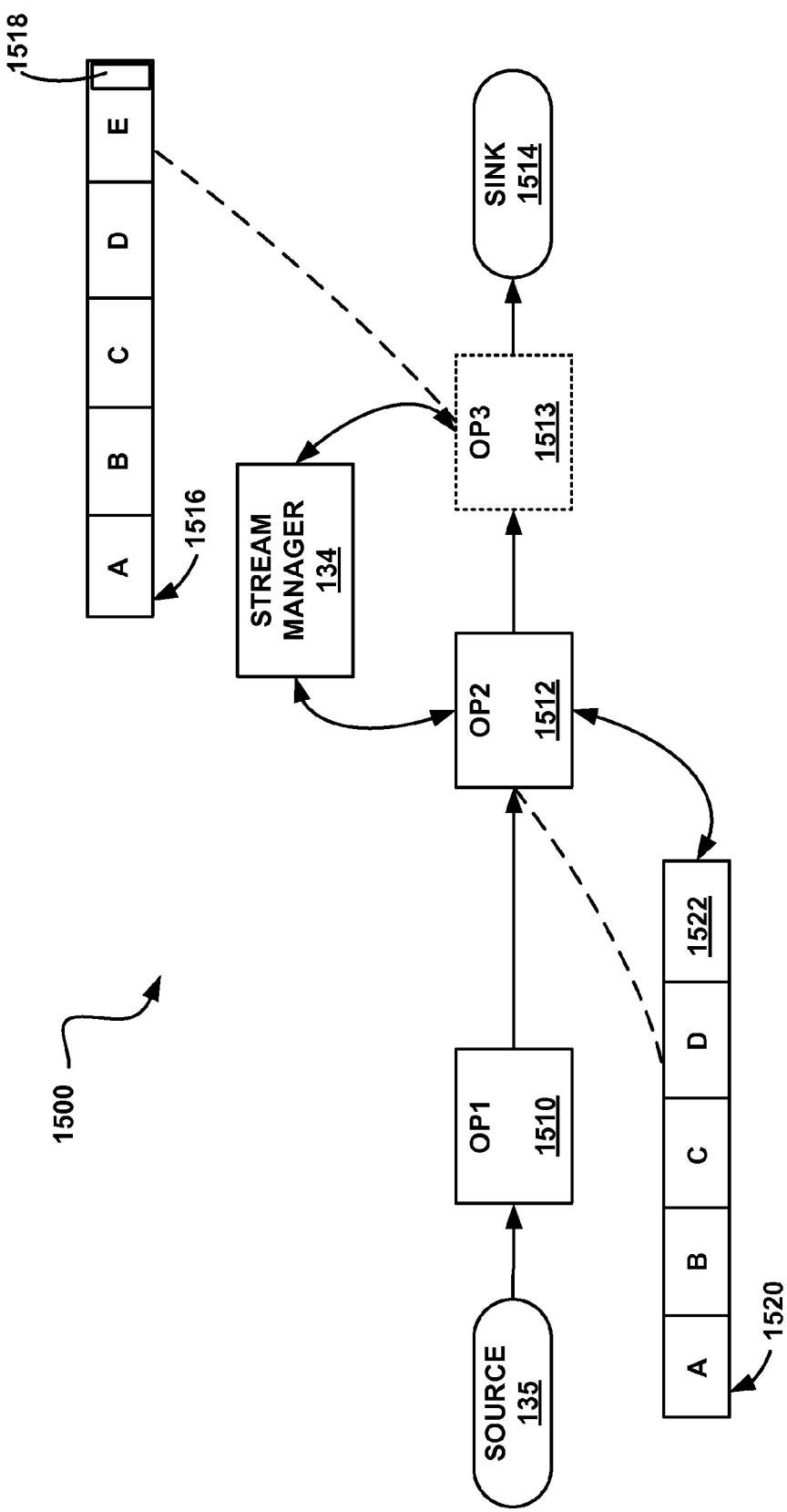
FIG. 15 illustrates an operator graph for using a unique identifier to retrieve an attribute with a tag, according to various embodiments.

FIG. 15 illustrates an operator graph 1500 where a tuple accesses a tagged attribute using a unique identifier, according to an embodiment. The operator graph 1500 may correspond to the flowchart of the method 1400 on FIG. 14. Portions of the operator graph 1500 may align with operator graph 1300 on FIG. 13. For example, a stream of tuples may be transmitted from a source 135. The first stream operator 1510 may correspond to the first stream operator 1310 in FIG. 13.

Operator graph 1500 may begin at the source 135 where a stream of tuples is received and processed by the first stream operator 1510, similar to the method 1200 in FIG. 12. The stream of tuples is processed and transmitted to a third stream operator 1513 and then transmitted to a sink 1514. The third stream operator may process the first tuple 1516 with five attributes, A, B, C, D, and E. Attribute E may have a tag 1518. The tag may perform a tracking function similar to in FIG. 13. The second stream operator 1512 may receive the second tuple 1520, with 4 attributes, A, B, C, and D, and may contain a unique identifier 1522 in place of attribute E.

The second stream operator 1512 may receive the second tuple 1520 and read the read the unique identifier 1522. The second stream operator 1512 may then communicate with the stream manager 134. The stream manager 134 may receive location information from a tag 1518 on the first tuple 1516. In the shown operator graph 1500, the location of the tag 1518 may be read by the third stream operator 1513. The third stream operator 1513 may transmit the location of the first tuple 1516 to the stream manager 134. The stream manager 134 may then transmit the location information to the second stream operator 1512. The second stream operator 1512 may receive attribute E and remove the unique identifier 1522 from the second tuple 1520. The second stream operator 1512 may associate attribute E with the second tuple 1520.

In some embodiments, the first tuple 1516 may not be in the operator graph 1500. If there is no tag 1518, then the stream manager 134 may search for the tag 1518 upstream, e.g., the first stream operator 1510. In another embodiment, the first tuple 1516 may be held at the third stream operator 1518 before it is transmitted to the sink 1514. The stream manager 134 may arrange attribute E to be read by one or more stream operators to associate attribute E with one or more second tuples 1520.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: (a) an object oriented programming language; (b) conventional procedural programming languages; and (c) a streams programming language, such as IBM Streams Processing Language (SPL). The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Although embodiments are described within the context of a stream computing application, this is not the only context relevant to the present disclosure. Instead, such a description is without limitation and is for illustrative purposes only. Additional embodiments may be configured to operate with any computer system or application capable of performing the functions described herein. For example, embodiments may be configured to operate in a clustered environment with a standard database processing application. A multi-nodal environment may operate in a manner that effectively processes a stream of tuples. For example, some embodiments may include a large database system, and a query of the database system may return results in a manner similar to a stream of data.

While the foregoing is directed to exemplary embodiments, other and further embodiments of the disclosure may be devised without departing from the basic scope thereof, and the scope thereof is determined by the claims that follow.

What is claimed is:

1. A system for referencing attributes from a stream of tuples, comprising:
    a plurality of processing elements capable of receiving the stream of tuples;
    the stream of tuples having at least a first tuple and a second tuple;
    a stream manager communicatively coupled with the processing elements for tracking the tuples and having a capability of selecting attributes in tuples, wherein one or more selected attributes are chosen from a group of candidate attributes;
    a first stream operator communicatively coupled with the stream manager and capable of receiving the stream of tuples, wherein the first stream operator selects the selected attribute of the first tuple and assigns a first identifier to the selected attribute;
    a second stream operator communicatively coupled with the stream manager and capable of receiving the stream of tuples, and capable of replacing the selected attribute in the second tuple with a second identifier provided by the first stream operator;
    an identifier table communicatively coupled with the stream manager and the first and second stream operator, wherein the identifier table includes identifiers for selected tuples.

2. The system of claim 1, wherein the selected attributes are selected based on one or more identification factors.

3. The system of claim 1, wherein the first identifier assigned to the selected attribute is a tag.

4. The system of claim 3, wherein the tag is associated to the second identifier by the identifier table.

5. The system of claim 3, wherein the tag is capable of being received by a third stream operator that transmits a location of the tag to the stream manager.

6. The system of claim 5, wherein the third stream operator is capable of transmitting the selected attribute on the first tuple to one or more tuples.

7. The system of claim 5, wherein the third stream operator is capable of delaying the first tuple.

8. The system of claim 3, wherein the tag includes a callback mechanism capable of having an adjustable frequency of alerts.

9. A computer program product comprising a computer readable medium and a program code for the system of processing the stream of tuples resident on the computer readable medium and defining the system of claim 1.

10. A method for referencing attributes in a streaming application, comprising:
    receiving a stream of tuples to be processed by a plurality of processing elements operating on one or more computer processors, each tuple containing one or more attributes, each processing element having one or more stream operators, each processing element assigned to one or more compute nodes;
    examining one or more candidate attributes;
    selecting a selected attribute from one or more candidate attributes;
    adding an identifier to the tuple;
    using the identifier to retrieve the selected attribute, wherein the using the identifier includes:
        reading the unique identifier on the second tuple by a second stream operator, wherein the second stream operator requires the selected attribute,
        matching the unique identifier to the selected attribute of the first tuple on the identifier table,
        locating the selected attribute, and
        transmitting the selected attribute from the first tuple to the second stream operator;
    monitoring one or more stream operators for one or more removal factors; and
    dereferencing the selected attribute if the removal factor is present.

11. The method of claim 10, wherein the examining one or more candidate attributes further includes:
    monitoring the candidate attribute for one or more identification factors;
    predicting a performance impact on a computing infrastructure using the identification factor; and
    identifying the candidate attribute that improves performance of the computing infrastructure.

12. The method of claim 10, the adding an identifier further includes:
    identifying the selected attribute of a first tuple,
    substituting the selected attribute of a second tuple with a unique identifier, wherein the unique identifier is matched to the selected attribute in an identifier table.

13. The method of claim 12, wherein the identifying the selected attribute includes attaching a tag to the selected attribute by a first stream operator.

14. A method of referencing attributes in a streaming application, comprising:
   receiving a stream of tuples to be processed by a plurality of processing elements operating on one or more computer processors, each processing element having at least a first stream operator, each stream operator being communicatively coupled to a stream manager;
   examining one or more candidate attributes;
   selecting one or more selected attributes from the candidate attributes;
   identifying the selected attribute of a first tuple,
   substituting the selected attribute of a second tuple with a unique identifier, wherein the the unique identifier is matched to the selected attribute in an identifier table;
   reading the unique identifier with a second stream operator, wherein the second stream operator requires the selected attribute;
   transmitting the selected attribute from the first tuple to the second stream operator;
   monitoring one or more stream operators for one or more removal factors; and
   modifying the identifier table if the removal factor is present.

15. The method of claim 14, wherein the examining one or more candidate attributes further includes:
   monitoring the candidate attribute for one or more identification factors;
   predicting an impact on a computing infrastructure using the identification factor; and
   selecting the candidate attribute that improves performance of the computing infrastructure.

16. The method of claim 15, wherein the identification factors are selected from: minimal change of the candidate attribute, lack of historical change of the candidate attribute, a large file size of the candidate attribute, and a small number of distinct possible values for the candidate attribute.

17. The method of claim 14, wherein the identifying the selected attribute includes attaching a tag to the selected attribute by the first stream operator.

18. The method of claim 14, wherein the reading the unique identifier includes locating the tag.

19. The method of claim 18, wherein the locating the tag produces a negative result, causing a substitution of the selected attribute to one or more unique identifiers on one or more upstream tuples when receiving the negative result.

* * * * *